F. R. FROST.
BOTTOM MOUNT FOR BEDPOSTS.
APPLICATION FILED AUG. 25, 1915.
1,194,164.
Patented Aug. 8, 1916.
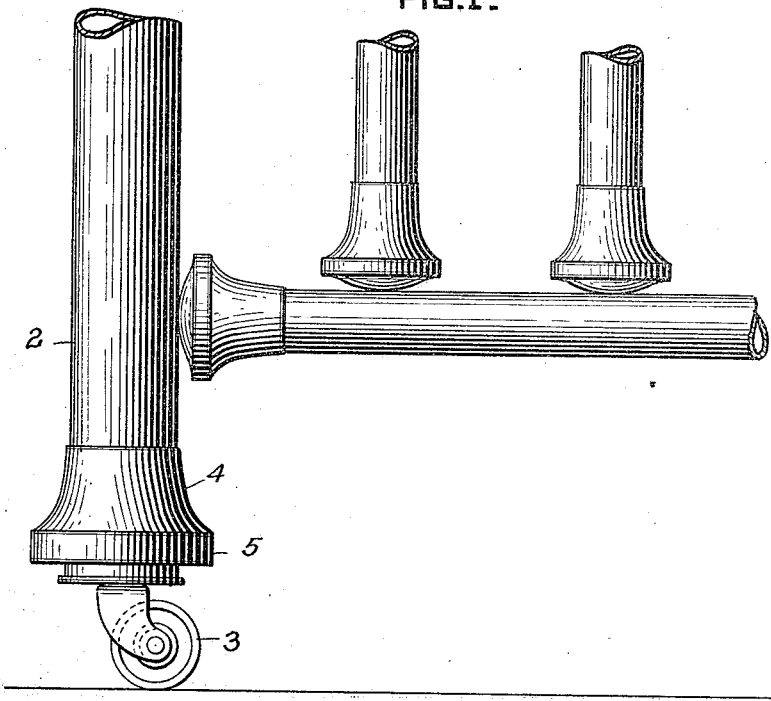
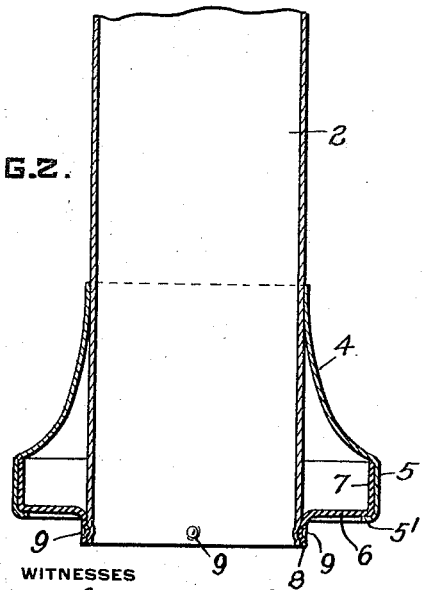
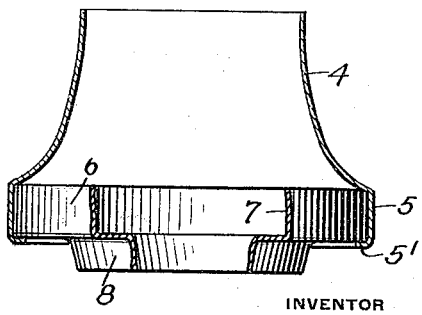
WITNESSES
INVENTOR
Frank R. Frost,

UNITED STATES PATENT OFFICE.

FRANK R. FROST, OF BUTLER, PENNSYLVANIA, ASSIGNOR TO PITTSBURGH-HICKSON COMPANY, OF BUTLER, PENNSYLVANIA, A CORPORATION OF PENNSYLVANIA.

BOTTOM MOUNT FOR BEDPOSTS.

1,194,164.          Specification of Letters Patent.       Patented Aug. 8, 1916.

Application filed August 25, 1915. Serial No. 47,274.

*To all whom it may concern:*

Be it known that I, FRANK R. FROST, a citizen of the United States, and resident of Butler, in the county of Butler and State of Pennsylvania, have invented certain new and useful Improvements in Bottom Mounts for Bedposts, of which the following is a specification.

The object of this invention is to provide a mount of improved construction adapted primarily to be applied to the lower end of a bed post, with improved means for securing the mount in position and for reinforcing it, whereby the mount, usually formed of relatively thin sheet metal, is securely held in place and strengthened for withstanding denting to which in its exposed position it is ordinarily subjected. Heretofore, the mount in question has been formed of relatively thin sheet metal which is not reinforced, and owing to its position at the bottom of the post soon becomes dented and disfigured caused by moving the bed against the base board or other fixed objects, also from contact with chairs, sweepers, etc. These difficulties are overcome by the present invention which provides for so reinforcing the belled or flared mount as to cause the relatively thin metal to resist without injury all ordinary knocks or jars, the reinforcements also providing convenient means for securing the mount to the post.

In the accompanying drawings, Figure 1 is an elevation of a portion of the corner post of a bed-frame equipped with a mount constructed in accordance with the invention. Fig. 2 is a sectional view of a portion of the post with the mount in place thereon, and Fig. 3 is a similar view of the mount detached from the post.

Referring to the drawings, 2 designates the corner post of a bed-frame to the lower end of which a caster 3 may be applied in any suitable manner. The corner posts of metallic beds are usually formed of sections of tubing, and it is customary to ornament the lower extremity thereof with a mount of relatively thin brass or other sheet metal. The mount is ordinarily flared, bulged or belled to provide an ornate effect. The mount here shown consists of the sleeve-like upper portion 4 which is flared downwardly and outwardly to form the annular ridge 5, and in the form of mount shown this ridged or bead-like portion, being the portion of largest diameter, is the part that is most exposed, particularly in view of its proximity to the floor. To strengthen the relatively thin metal of this outwardly bulged mount, a ring-like reinforcement 6 is secured in the enlarged portion thereof, the outer periphery of the reinforcement having the upstanding annular flange 7 which fits within and comprises a lining for the bulge or ridge 5, thereby providing a double thickness of metal for the portion of the mount subjected to the greatest wear and roughest usage. The ring-like body of the reinforcement comprises a horizontal strengthening rib which in itself materially stiffens the mount. The reinforcement 6 is secured in the mount bulge 5 by crimping the bottom edge of the latter as indicated at 5'.

The inner periphery of the reinforcement is flanged downwardly at 8 to closely embrace the post, and this flange is utilized for securing the mount in position, in the arrangement shown flange 8 and the post tube being dented in interlocking engagement as shown at 9. Thus a convenient and readily accessible securing means is provided which in no way impairs the appearance of the mount, avoiding the use of holding screws that are ordinarily projected through the ornamental portion of the mount and into the post.

With the thin metal mount thus reinforced it will retain its shape and ornate appearance in its exposed position quite as effectually as though its bulged portion were solid metal.

I claim:

1. The combination of a bed-post, a mount therefor formed of relatively thin metal with the mount flared outwardly at one end and at its opposite end adapted to fit around the post, and a ring-like reinforcement entered in the flare of the mount, the inner periphery of the reinforcement flanged for bearing against the post extending therethrough and with means for securing the flange to the post.

2. The combination of a bed-post, a mount therefor comprising a metallic shell at one end embracing the post and at the opposite end having an outwardly flared portion, and a reinforcement entered in the flared portion, said reinforcement provided with a post-embracing passage through which the post is adapted to extend.

3. The combination of a bed-post, a mount therefor comprising a metallic shell having one end adapted to fit around the post and the other end outwardly flared a distance therefrom, and a reinforcement embracing the post and fitting within the flared portion thereby stiffening said portion and maintaining the mount in position around the post.

In testimony whereof I affix my signature in presence of two witnesses.

FRANK R. FROST.

Witnesses:
FRANK H. MURPHY,
HENRY L. GRAHAM.

Copies of this patent may be obtained for five cents each, by addressing the "Commissioner of Patents, Washington, D. C."